United States Patent [19]

Bieri

[11] 4,408,688

[45] Oct. 11, 1983

[54] DEVICE FOR COATING A SURFACE OF A CONVEYOR BAND

[75] Inventor: Rudolf Bieri, Winterthur, Switzerland

[73] Assignee: Rud. Bieri Maschinen Und Apparatebau AG, Effretikon, Switzerland

[21] Appl. No.: 320,686

[22] Filed: Nov. 12, 1981

[30] Foreign Application Priority Data

Nov. 14, 1980 [CH] Switzerland .................... 8461/80

[51] Int. Cl.³ .............................................. B65G 45/02
[52] U.S. Cl. .................................. 198/500; 15/256.53; 184/16; 184/102
[58] Field of Search .................. 198/500; 184/16, 102; 118/70; 15/256.53

[56] References Cited

U.S. PATENT DOCUMENTS 2,640,744 6/1953 Harkenrider ...................... 184/102

FOREIGN PATENT DOCUMENTS 284956 1/1971 U.S.S.R. ............................ 15/256.53

Primary Examiner—Joseph E. Valenza
Assistant Examiner—Jonathan D. Holmes
Attorney, Agent, or Firm—Karl F. Ross

[57] ABSTRACT

An endless conveyor band guided around horizontal deflecting rollers, especially a transporter of bakery goods, is coated with a consumable bond-breaking substance by means of a device juxtaposed with a rising bight portion of the band hugging one deflecting roller. The device comprises a mobile carriage biased by gravity toward that deflecting roller from which it is held separated by a pair of spacing rolls. Coating material is applied to the band surface, at a plurality of axially spaced locations, by respective daubers which may be catapults periodically dipping into a bath of coating liquid, or guides for sticks of semi-solid coating material continuously pressed against the band. A distributor reciprocable in axial direction comprises a plurality of wipers sweeping a zone of the band above the daubers for spreading the locally deposited coating matter over the entire surface.

11 Claims, 4 Drawing Figures

DEVICE FOR COATING A SURFACE OF A CONVEYOR BAND

FIELD OF THE INVENTION

My present invention relates to an apparatus for continuously coating a surface of an endless conveyor band, particularly (but not exclusively) one used for transporting bakery goods through an oven, e.g. for the purpose of preventing adhesion between the conveyor surface and the goods.

BACKGROUND OF THE INVENTION

Various devices are known for applying a coating to a conveyor band already installed. Some of them use spray guns by which the liquid coating material (e.g. a bond-breaking agent such as a hydrogenated vegetable oil) is applied to the band surface. Even with several such spray guns, however, it is difficult to obtain a layer of uniform thickness on the conveyor band with the result that goods picking up different amounts of coating material may exhibit irregularities which might cause problems during handling, e.g. upon automatic packaging.

Similar drawbacks, due especially to an uneven conveyor surface, are encountered with another conventional device by which the coating material is dripped onto the upper run of the band and is distributed thereover by a wiper assembly. Such a device, furthermore, limits the space available above the conveyor for the installation of a feeder for the goods to be transported.

OBJECT OF THE INVENTION

The object of my present invention, therefore, is to provide an improved coating apparatus designed to produce a layer of substantially uniform thickness without obstructing any part of the upper run of the conveyor band.

SUMMARY OF THE INVENTION

A coating apparatus according to my invention comprises support means juxtaposable with a deflecting roller which is hugged by a rising bight portion of an endless conveyor band to be coated. The coating material is deposited on that bight portion at mutually isolated locations, spaced apart in axial direction of the deflecting roller, by applicator means on the support means including a plurality of daubers and is then spread across the band surface by distributing means on the support means including a holder which carries a plurality of axially spaced-apart wipers and engages a horizontal guide structure along which it is reciprocated by associated drive means to displace the wipers across a zone of the bight portion above the locations to which the material is applied by the daubers.

If the coating material is a liquid, the daubers may be constituted by axially separated catapults which are mounted on a common horizontal shaft and have scoop-shaped lower ends dipping in a retracted position into a vessel holding a bath of that liquid, the shaft being operatively coupled with the actuating means for periodically propelling these catapults from their retracted position toward the deflecting roller whereby blobs of liquid are splashed onto the conveyor band.

Alternatively, the daubers may be designed as guides for semi-solid sticks of coating material extending in a generally radial direction of the deflecting roller, the sticks being urged toward that roller by loading means so as to deposit their material onto the band surface in the form of parallel streaks. Whether liquid or semi-solid, the coating material will be uniformly spread over the conveyor surface by the wipers which lie above the daubing locations while confronting a rising portion of the conveyor band so that the coating material immediately reaches the upper band surface on which the goods are being transported.

By choosing a zone at a bight of the conveyor band for the application and distribution of the coating material, I not only eliminate any obstruction of the upper run of the band but have also available a stretch of that band free from the unevennesses which unavoidably occur in the sagging upper and lower horizontal runs of the conveyor.

The support means referred to advantageously comprise a carriage which is movably disposed on a stationary base and has wheels engaging rails on that base which have sloping sections gravitationally biasing the carriage toward the juxtaposed deflecting roller. Such a floatingly mounted carriage can be easily removed, e.g. in order to receive fresh coating material or for the purpose of inspection or repair.

BRIEF DESCRIPTION OF THE DRAWING

The above and other features of my invention will now be described in detail with reference to the accompanying drawing in which.

SPECIFIC DESCRIPTION

Figure 1:
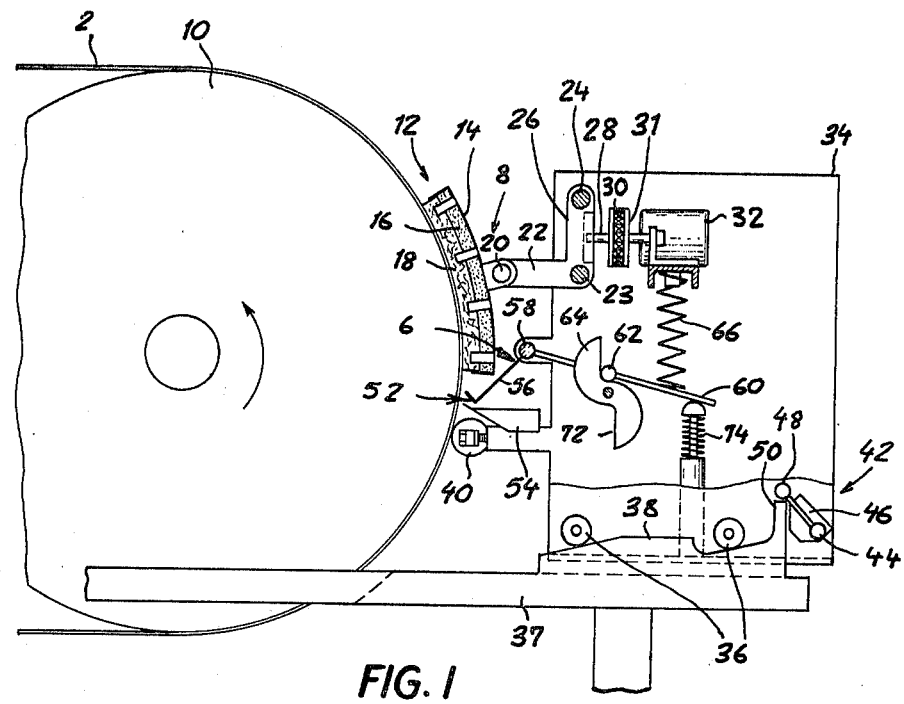
FIG. 1 is a side-elevational view of a coating apparatus embodying my invention.
Figure 2:
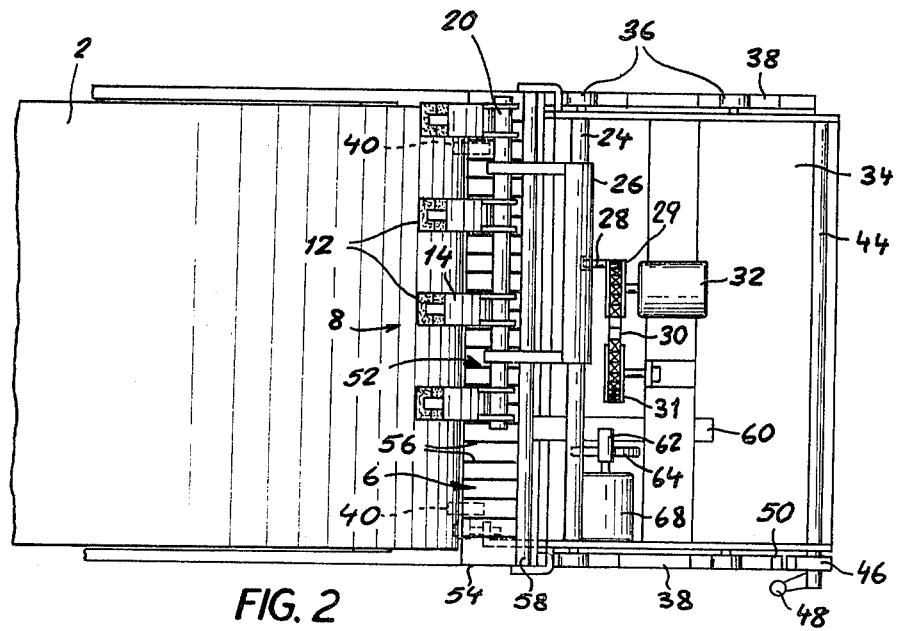
FIG. 2 is a top view of the apparatus shown in FIG. 1.
Figure 3:
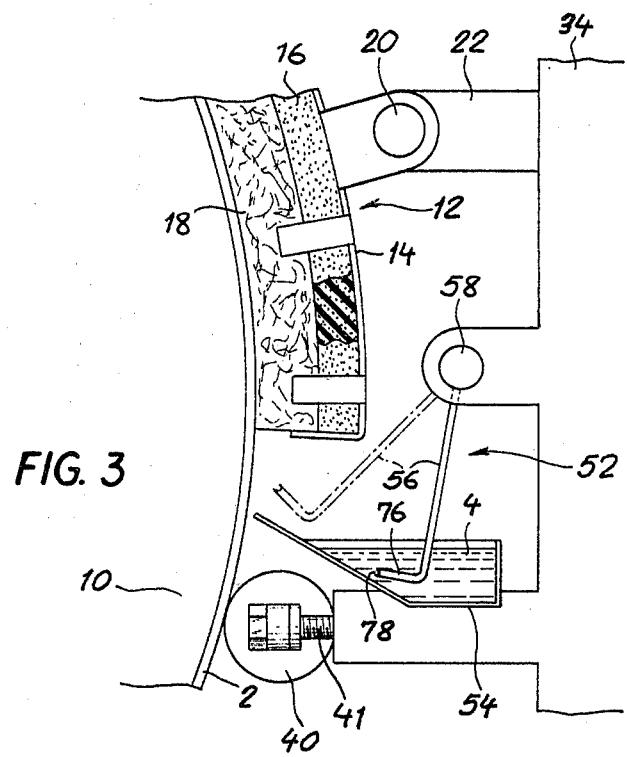
FIG. 3 is a fragmentary side-elevational view, drawn to a larger scale, of certain details of the apparatus shown in FIGS. 1 and 2.

FIGS. 1-3 show an apparatus for the continuous coating of an endless conveyor band 2, e.g. a steel sheet, led about two horizontal deflecting rollers 10 (only one shown) with a consumable liquid such as oil serving as a bond breaker in the transportation of bakery goods as discussed above. The coating liquid 4 (FIG. 3) forms a bath in a vessel 54 which is part of an applicator generally designated 6, this applicator being mounted on a carriage 34 together with a distributor 8 which lies above the applicator and is thus disposed downstream of the latter as seen in the direction of band motion which is upward with roller 10 rotating counterclockwise.

The distributor 8 comprises several axially spaced wipers 12 which are articulated to a rod 20, the latter being supported by arms 22 on a holder 26 which is slidably guided on a pair of horizontal rods 23, 24 rigid with carriage 34. Holder 26 has a vertical slot engaged by a pin 28 which is fixed to an endless chain 30 in mesh with a pair of sprockets 29, 31, sprocket 29 being driven by a motor 32 also installed on carriage 34. The carriage is provided with two pairs of wheels 36 which ride on rails 38 extending generally radially of deflecting roller 10 and are rigid with a fixed base 37 supporting the carriage; rails 38 have sloping portions causing the carriage 34 to be biased by gravity toward deflecting roller 10. The necessary separation between that deflecting roller and the carriage is maintained by a pair of spacing rolls 40 mounted on the carriage and engaging the roller 10 through the intermediary of band 2. The carriage is further provided with a detent 42 comprising an eccentric block 46 which can be manually swung, with the aid of a lever 48, about a horizontal pivot stud 44 so as to bear upon an abutment 50 on base 37 whereby the carriage is retracted to the right into an inoperative position in which its spacing rolls 40 are well separated from the conveyor 2, 10. Abutment 50 is constituted in this instance by an extension of one of the rails 38.

Each wiper 12 comprises, as best illustrated in FIG. 3, a rigid arcuate strip 14 which is curved about the axis of deflecting roller 10 and carries on its concave side an elastic substrate 16, e.g. a strip of foam rubber, to which a porous contact layer 18 is attached. This contact layer, which preferably consists of felt, completely adapts itself to the curvature of the bight of conveyor band 2 because of its mobility in a vertical plane afforded by its pivotal mounting on rod 20. The axial separation of the several wipers 12 is not greater than the stroke of reciprocation of holder 26 on rods 23, 24, as determined by the length of driving chain 30, in order to insure that the coating liquid is swept across the full width of the band.

The applicator 6 comprises a plurality of axially spaced daubers 52 in the form of elbow-shaped catapults fixedly mounted on a horizontal shaft 58. Each catapult has a long arm 56 and a short arm 76 with a scoop-shaped extremity 78. In a retracted position illustrated in full lines in FIG. 3, each catapult dips into the bath of coating liquid 4 contained in vessel 54. Shaft 58 is rigid with a lever 60 whose free end is loaded by a compression spring 66 causing a cam-follower roll 62 to bear upon a rotary cam disk 64 with two discontinuities 72 formed by radial flanks spaced 180° apart. Cam disk 64 is continuously rotated by another motor 68 on carriage 34 for simultaneously propelling all catapults 52 from the aforementioned retracted position into an advanced position seen in FIG. 1 and indicated in phantom lines in FIG. 3; this motion occurs as the roller steps off the counterclockwise-rotating disk 64 at one of its discontinuities 72. A bumper 74 resiliently intercepts the free end of lever 60 at these instants.

As will be readily apparent, the sudden forward thrust of the catapults 52 splashes blobs of liquid 4 onto the surface of conveyor band 2 below the zone swept by wipers 12. These wipers, therefore, distribute the applied liquid uniformly over the width of the conveyor; the speed of motors 32 and 68 should, of course, be chosen high enough with reference to the conveyor speed to insure that no bare spots are left on the band surface.

Figure 4:
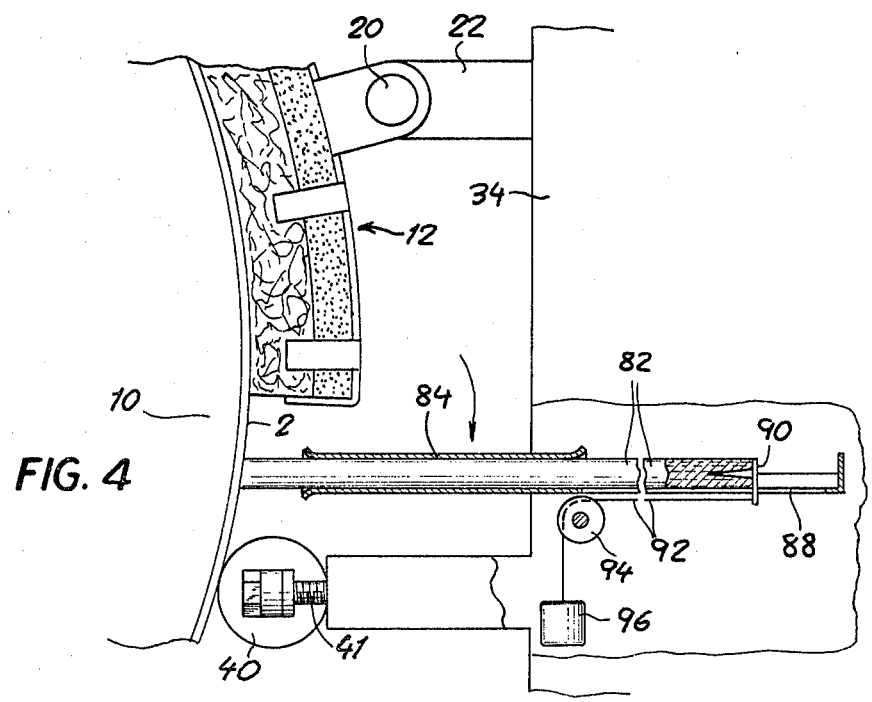
FIG. 4 is a side-elevational detail view, generally similar to FIG. 3, of part of a modified apparatus according to my invention.

In FIG. 4 I have shown a modified dauber 80 in the form of a tubular guide 84 accommodating a stick 82 of semi-solid coating material pointing substantially at the axis of deflecting roller 10, there being of course a plurality of such daubers disposed at axially spaced locations over the width of carriage 34. Each daubing stick 82 has a rear end engaged by a pusher 90 which extends downward through a longitudinal slot 88 of guide 84 and is attached to a wire 92 that is wound about a roller 94 and carries a weight 96. This weight, it will be readily apparent, exerts a uniform pressure upon the stick 82 as it streaks the surface of band 2 below the wipers 12. Guide tube 84 is upwardly open to the rear of roller 94 in order to facilitate the removal of the remnant of a spent stick.

The pressure of the wipers 12 upon the band surface can be altered with the aid of an adjustable mounting 41 for the spacing rolls 40. In the embodiment of FIGS. 1–3, the coating bath in vessel 54 may be maintained at a constant level with the aid of a conventional float-type controller, not shown, if fresh liquid 4 is continuously available from a nonillustrated source. The choice of the bath level, or the number of daubers 80 in the embodiment of FIG. 4, determines the rate of application of the coating material to the conveyor band 2.

Base 37 is part of the machine frame on which the conveyor 2, 10 is mounted.

I claim:

1. An apparatus for coating a surface of an endless conveyor band, comprising:
   support means juxtaposable with a deflecting roller hugged by a rising bight portion of a conveyor band to be coated;
   applicator means on said support means including a plurality of daubers adapted to deposit coating material upon said bight portion at mutually isolated locations spaced apart in axial direction of said deflecting roller; and
   distributing means on said support means including a holder, a plurality of wipers on said holder spaced apart in said axial direction, a horizontal guide structure on said support means engaged by said holder, and drive means on said support means coupled with said holder for reciprocating said holder along said guide structure with resulting displacement of said wipers across a zone of said bight portion lying above said locations.

2. An apparatus as defined in claim 1 wherein each of said wipers comprises a rigid arcuate strip curved in a vertical plane about the axis of the juxtaposed deflecting roller, an elastic substrate on the concave side of said strip and a porous contact layer on said substrate, said strip being pivoted to said holder for swinging in said vertical plane.

3. An apparatus as defined in claim 1 wherein said applicator means comprises a vessel adapted to hold a bath of coating liquid, said daubers being axially separated catapults mounted on a common horizontal shaft and provided with scoop-shaped lower ends dipping into said coating liquid in a retracted position, said shaft being operatively coupled with actuating means for periodically propelling said catapults from said retracted position toward said deflecting roller, thereby splashing blobs of coating liquid upon said conveyor band.

4. An apparatus as defined in claim 3 wherein said actuating means comprises a lever rigid with said shaft, a rotary cam with at least one discontinuity coacting with a cam follower on said lever, spring means biasing said cam follower into contact with said cam, and a motor coupled with said cam for rotating same about a horizontal axis parallel to that of said deflecting roller.

5. An apparatus as defined in claim 4 wherein said actuating means further comprises a resilient bumper positioned to intercept said lever upon said cam follower encountering said discontinuity.

6. An apparatus as defined in claim 1 wherein said daubers comprise guides for semi-solid sticks of coating material extending in a generally radial direction of said deflecting roller and loading means for urging said sticks toward said deflecting roller.

7. An apparatus as defined in claim 6 wherein said loading means comprises a thrust member coupled with a weight.

8. An apparatus as defined in claim 1, 3 or 6 wherein said support means comprises a carriage movably disposed on a stationary base, said carriage having wheels engaging rails on said base disposed in planes transverse to the axis of said deflecting roller.

9. An apparatus as defined in claim 8 wherein said rails have sloping sections gravitationally biasing said carriage toward said reflecting roller.

10. An apparatus as defined in claim 9 wherein said carriage has a pair of spacing rolls engageable with said conveyor band to keep said carriage separated from said deflecting roller.

11. An apparatus as defined in claim 10 wherein said carriage is provided with detent means operable to engage an abutment on said base for holding said carriage separated from said deflecting roller by a distance greater than that established by said spacing rolls.

* * * * *